United States Patent
Yanagawa et al.

(10) Patent No.: US 7,255,958 B2
(45) Date of Patent: Aug. 14, 2007

(54) CELL HAVING FLAT WOUND ELECTRODE ASSEMBLY AND METHOD OF PRODUCING SUCH CELL

(75) Inventors: Toshirou Yanagawa, Sumoto (JP); Katsuya Mototani, Hyogo (JP); Tatsuya Nagare, Hyogo (JP); Hiroto Izui, Tokushima (JP); Takashi Kondou, Tokushima (JP); Yoshinori Yatabe, Tokushima (JP)

(73) Assignee: Sanyo Electric Co., Ltd., Osaka (JP)

( * ) Notice: Subject to any disclaimer, the term of this patent is extended or adjusted under 35 U.S.C. 154(b) by 489 days.

(21) Appl. No.: 10/849,794

(22) Filed: May 21, 2004

(65) Prior Publication Data
US 2004/0232882 A1 Nov. 25, 2004

(30) Foreign Application Priority Data
May 23, 2003 (JP) .............................. 2003-145674

(51) Int. Cl.
*H01M 6/10* (2006.01)
*H01M 2/18* (2006.01)

(52) U.S. Cl. .......................... 429/94; 429/133; 429/140

(58) Field of Classification Search .................. 429/94, 429/133, 140, 154, 162; 29/623.3
See application file for complete search history.

(56) References Cited

U.S. PATENT DOCUMENTS 6,040,082 A * 3/2000 Haas et al. .................. 429/163

FOREIGN PATENT DOCUMENTS

| JP | 55-117875 | * | 9/1980 |
| JP | 03-141558 | | 6/1991 |
| JP | 09-213374 | | 8/1997 |
| JP | 11-307132 | | 11/1999 |

* cited by examiner

*Primary Examiner*—Mark Ruthkosky
*Assistant Examiner*—Thomas H. Parsons
(74) *Attorney, Agent, or Firm*—Westerman, Hattori, Daniels & Adrian, LLP.

(57) ABSTRACT

A method includes the steps of: with the use of a winding core having a first member wherein its cross sectional-area in the direction orthogonal to the revolving axis and the peripheral length of the cross section are larger than those of a second member, passing a strip-shaped separator between the first member and the second member, placing one strip-shaped electrode plate near the second member such that the plate is not in contact with the winding core, and winding for one revolution the one electrode plate and the strip-shaped separator toward the first member; placing another strip-shaped electrode plate between the inner and outer portions of the separator that have been revolved along with the one electrode, winding both electrodes along with the separator toward the first member by revolving the winding core; removing the winding core and pressure-molding the resulting wound article into a flat wound electrode assembly.

6 Claims, 4 Drawing Sheets

CELL HAVING FLAT WOUND ELECTRODE ASSEMBLY AND METHOD OF PRODUCING SUCH CELL

BACKGROUND OF THE INVENTION (1) Field of the Invention

The present invention relates to the improvement of flat wound electrode assemblies for the purpose of improving the volume energy density of cells.

(2) Description of the Prior Art

In recent years, there has been strong demand for the improvement of the energy density and high-rate discharging characteristics of cells.

By using wound-type electrode assemblies the surface areas of the negative electrode and positive electrode have been increased, thus trying to improve the energy density and high-rate discharging characteristics of cells. On the other hand, square cells and cells using laminate outer casings can be efficiently mounted in equipment such as mobile phones and notebook personal computers. In these applications, there is strong demand in the market for thin cells having high energy density.

In square cells and cells using laminate outer casings, flat wound electrode assemblies are usually encased rather than circular ones. Such electrode assemblies are prepared by such a method as shown in FIG. 5. A winding core 1 having a circular cross section and a slit 2 in its diameter direction is used. A strip-like separator 3 is passed through the slit and an negative electrode 4 and positive electrode 5 are engaged on each surface of the separator while it is being wound, resulting in a circular wound electrode assembly. After removing the winding core 1, the electrode assembly is pressure-molded into the flat would electrode assembly as shown in FIG. 5(e).

However, electrode assemblies produced by this method have the separator laminated in quadruplicate in the center of the electrode assemblies as shown in FIG. 5(e). The excessive triplicate separator portion that does not contribute to insulation increases the thickness of the wound electrode assembly, causing the problem of an increased volume and reduced energy density.

Previously suggested methods of producing wound electrode assemblies include the following techniques.

(1) There is suggested a technique in which by changing the shape of the winding core in a cylindrical cell having a wound electrode assembly, it is made easy to insert a welding electrode bar for welding the outer casing can and collector, so as to avoid defectiveness caused by electrode bar insertion (see, e.g., Patent Document 1).

(2) There is suggested a technique in which by changing the shape of the winding core in a cylindrical cell having a wound electrode assembly, it is made easy to remove the winding core from the wound electrode assembly with the winding core (see, e.g., Patent Document 2).

(3) There is suggested a technique in which: the both surfaces and ends in a longitudinal direction of an electrode plate of one polarity is enclosed with a separator; via the separator, a tip of the other polarity electrode plate is placed near the first folded part of the one polarity electrode plate, the placement being inside the end to the first folded part of the one polarity electrode plate; the other polarity electrode plate is folded at the end of the one polarity electrode plate, and then wound to face the one polarity electrode plate via the separator. Thus, different polarity electrodes face each other at the entire winding core, improving the volume energy density of a square cell (see, e.g., Patent Document 3).

Patent Document 1: Japanese Unexamined Patent Publication No. 03-141558.

Patent Document 2: Japanese Unexamined Patent Publication No. 11-307132.

Patent Document 3: Japanese Unexamined Patent Publication No. 09-213374.

According to Patent Document 1, there is a step in which an auxiliary pin is removed in advance, and then the winding core is revolved against a group of wound electrodes, so as to press the separator sandwiched between the winding core and auxiliary pin against the inside wall of the group of wound electrodes. This step causes to obtain a large cylindrical cavity, thus avoiding defectiveness caused by electrode bar insertion. This technique, however, allows only for cylindrical wound electrodes; as shown in the figures of this document, the winding of both electrode plates commences right after insertion of the group of wound electrodes and separator prepared, and therefore the both electrode plates face each other via the separator in the center of thus wound article. This causes, at the time of molding into a flat shape, the electrode plate at the center of the wound article to be folded acutely, and the resulting edged portion to break through the separator, resulting in short circuiting between the electrodes. Thus, the problem of cell reliability remains with this technique. Additionally, since the electrode plates are inserted right after the separator is inserted into the winding core and the winding has commenced, it is impossible to greatly reduce the length of the separator at the center of the wound article, compared with a winding core that is so divided that its cross section is symmetrical.

According to Patent Document 2, with the winding core comprising the winding core body and a pressing pin, it is easy to remove the wound article from the winding core after completion of the winding. This technique, however, has such a complicated mechanism that the separator is inserted into the winding core body and the pressing pin is rotatively lowered from above the winding core body. Such complicated mechanism is not appropriate for rapid mass production of wound electrode assemblies.

According to Patent Document 3, it is possible to improve volume energy density. This technique, however, requires the following complicated steps: two separators placed in both sides of a negative electrode plate are adhered and then cut with a separator adhesion and cutting device, and then the negative electrode is inserted further inward between the two adhered separators; the resulting article with the negative electrode plate therebetween is moved between winding cores; subsequently, a positive electrode is inserted between the winding cores from the direction opposite the negative electrode; the winding cores are so revolved that they sandwich the positive electrode plate, separators, and negative electrode plate, with the positive electrode plate being on the innermost side; before further revolution, the positive electrode plate is cut to a predetermined length with a positive electrode cutting device, and the negative electrode plate is cut to a predetermined length with a negative electrode cutting device; and one of the separators is heat welded to the separator junction portion of the other already wound separator. Additionally, an edged portion can break through the separators, in the same manner as Patent Document 1. Thus, this technique has the problem of poor work efficiency, increased manufacturing cost, and poor reliability.

SUMMARY OF THE INVENTION

In view of the foregoing and other problems, it is an object of the present invention to provide a flat wound electrode assembly having high volume energy density at a low cost.

(a) In order to accomplish the above object, in a first aspect of the present invention, there is provided a cell comprising a cell outer casing structure, a flat wound electrode assembly housed in the cell outer casing structure, and an electrolyte wherein: the flat wound electrode assembly is such that a positive electrode plate and a negative electrode plate are spirally wound with a separator therebetween into a flat shape; and a perspective view of the center of the flat wound electrode assembly seen from the shortest radius direction shows that two portions of an innermost electrode plate of one polarity face each other via a duplicate portion of a separator.

With this construction, a perspective view of the center of the flat wound electrode assembly from the shortest radius direction shows that a portion of the separator between two portions of an innermost electrode plate of one polarity is in duplicate rather than in quadruplicate as in the prior art technique, thus improving volume energy density.

(b) In the above cell, each end of the negative electrode plate and the positive electrode plate on the side of the center of the winding may not bend, the positive electrode plate and the negative electrode contained in the flat wound electrode assembly; and the length from each end of the positive electrode plate and the negative electrode plate on the side of the center of the winding to each first bending portion may be the longest.

With this construction, as shown in FIG. 1(e), the end 4a of the negative electrode plate on the side of the center of the winding, the end 5a of the positive electrode on the side of the center of the winding, and the negative electrode do not bend acutely, and therefore there are no edges in the ends 4a and 5a on the side of the center of the winding. Additionally, the electrode immediately outside 4b, which bends in the most acute way, has the same polarity, and therefore the possibility of short circuiting is reduced. Further, the bending of the first bending portion 5b is slight, and therefore there are no edges in this portion either. Further, the length from the end 4a of the negative electrode plate on the side of the center of the winding to the first bending portion 4b is the longest, and likewise the length from the end 5a of the positive electrode plate on the side of the center of the winding to the first bending portion 5b is the longest, and therefore the cross sectional shape of the wound article after pressure-molded becomes approximately symmetrical. This makes the pressure applied on the electrodes and separator uniform, which in turn makes cell characteristics stable and increases volume energy density. This results in the prevention of short circuiting between the electrodes caused by the edges breaking through the separator, thus increasing cell reliability.

(c) In order to accomplish the above object, in a second aspect of the present invention, there is provided a method of producing a cell comprising a flat wound electrode assembly, the method comprising the steps of: with the use of a winding core comprising a first member wherein its cross sectional-area in the direction orthogonal to the revolving axis and the peripheral length of the cross section are larger than those of a second member and the second member wherein its cross sectional-area in the direction orthogonal to the revolving axis and the peripheral length of the cross section are smaller than those of the first member, and after passing a strip-shaped separator between the first member and the second member, placing one strip-shaped electrode plate near the second member such that the plate is not in contact with the winding core, and winding for one revolution the one electrode plate and the strip-shaped separator toward the first member; placing the other strip-shaped electrode plate between the inner and outer portions of the separator that have been wound along with the one electrode, and winding the both electrode plates along with the separator toward the first member by revolving the winding core; and removing the winding core and pressure-molding the resulting wound article into the flat wound electrode assembly.

With this method, a portion of the separator which is wound around the second member in the first step is placed in the laminating portion of the separator in the center of the flat wound electrode assembly. This portion of the separator is wound around the second member, which has the smaller peripheral length in its cross section than the first member, and therefore is shorter than those prepared in the prior art technique. Thus, the length of the separator in its laminating portion is made shorter, improving volume energy density. As a result, the cell of the first aspect of the present invention is obtained by the second aspect of the present invention.

Note that the first and second members of the winding core may be welded to each other at one or both ends of the winding core.

(d) In the above method, the cross sectional shape (parallel to the revolving plane of the winding core) orthogonal to the revolving axis of the winding core may be a point-symmetrical shape.

With this construction, the separator and both electrodes are wound by revolving the winding core with the point of symmetry being the center of revolution, and thus the cross sectional shape of the flat wound electrode assembly becomes stable, improving the quality of the resulting wound article.

(e) In the above method, the cross sectional shape orthogonal to the revolving axis of the winding core may be such a shape that part of the point-symmetrical view is removed, and the removed shape is formed by removing part of the second member, the removed part of the second member being on the rear side in the direction of revolution.

With this construction, one electrode plate is placed in the removed part and the winding core is revolved with the point of symmetry being the center of revolution. Removing part of the second member further reduces the lamination of the separator in the center of the electrode assembly.

(f) In the above method, each end of the one electrode plate and the other electrode plate on the side of the center of the winding does not bend, the positive electrode plate and the negative electrode contained in the flat wound electrode assembly; and the length from each end of the one electrode plate and the other electrode plate on the side of the center of the winding to each first bending portion is the longest.

With this construction, a cell having the construction described in (b) above is obtained, thus increasing cell reliability.

DESCRIPTION OF THE PREFERRED EMBODIMENTS

Figure 1:
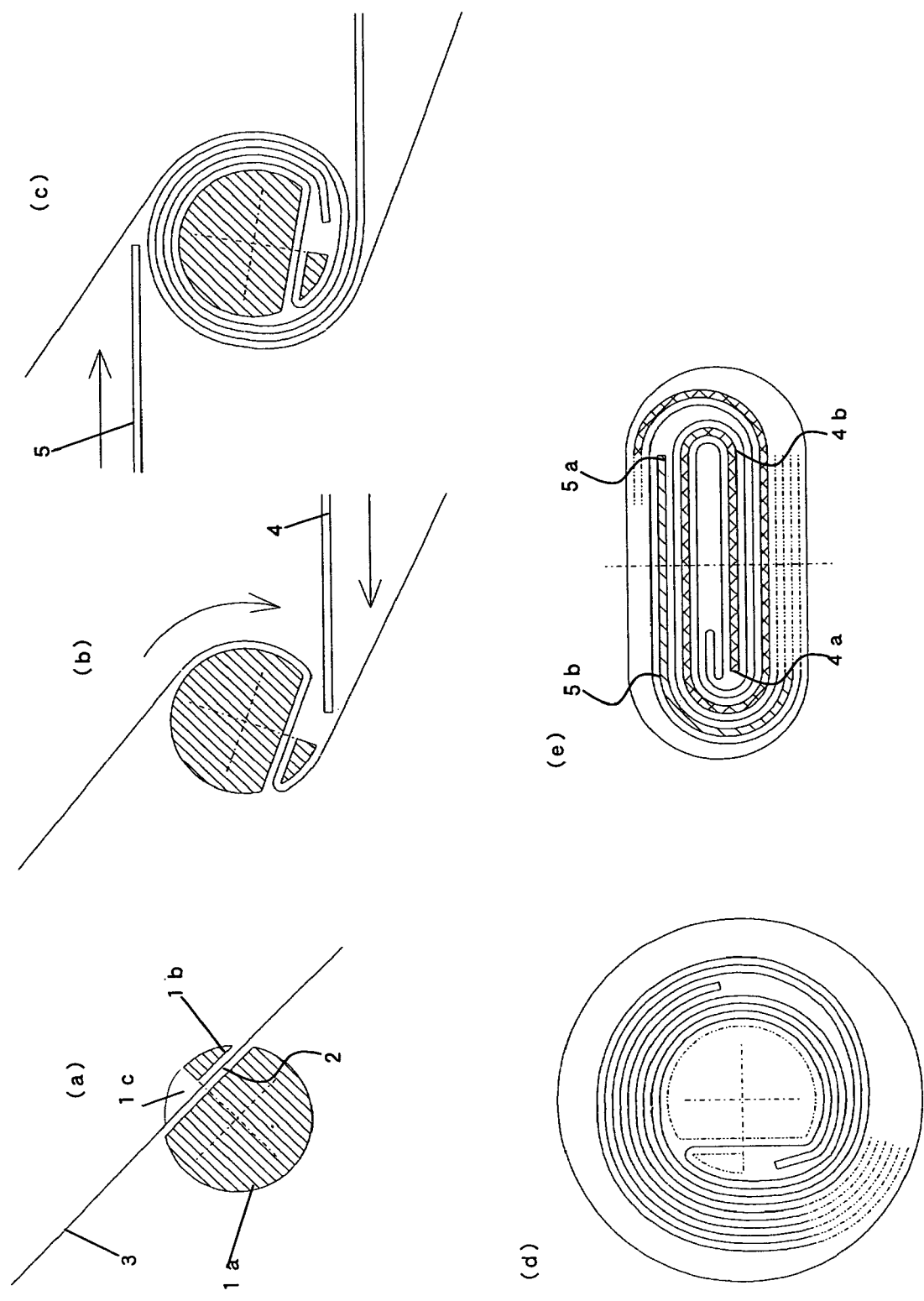
FIG. 1 is a schematic view showing the winding core for use in preparation of a flat wound electrode assembly according to Example 1 and the method of preparing an electrode assembly.
Figure 4:
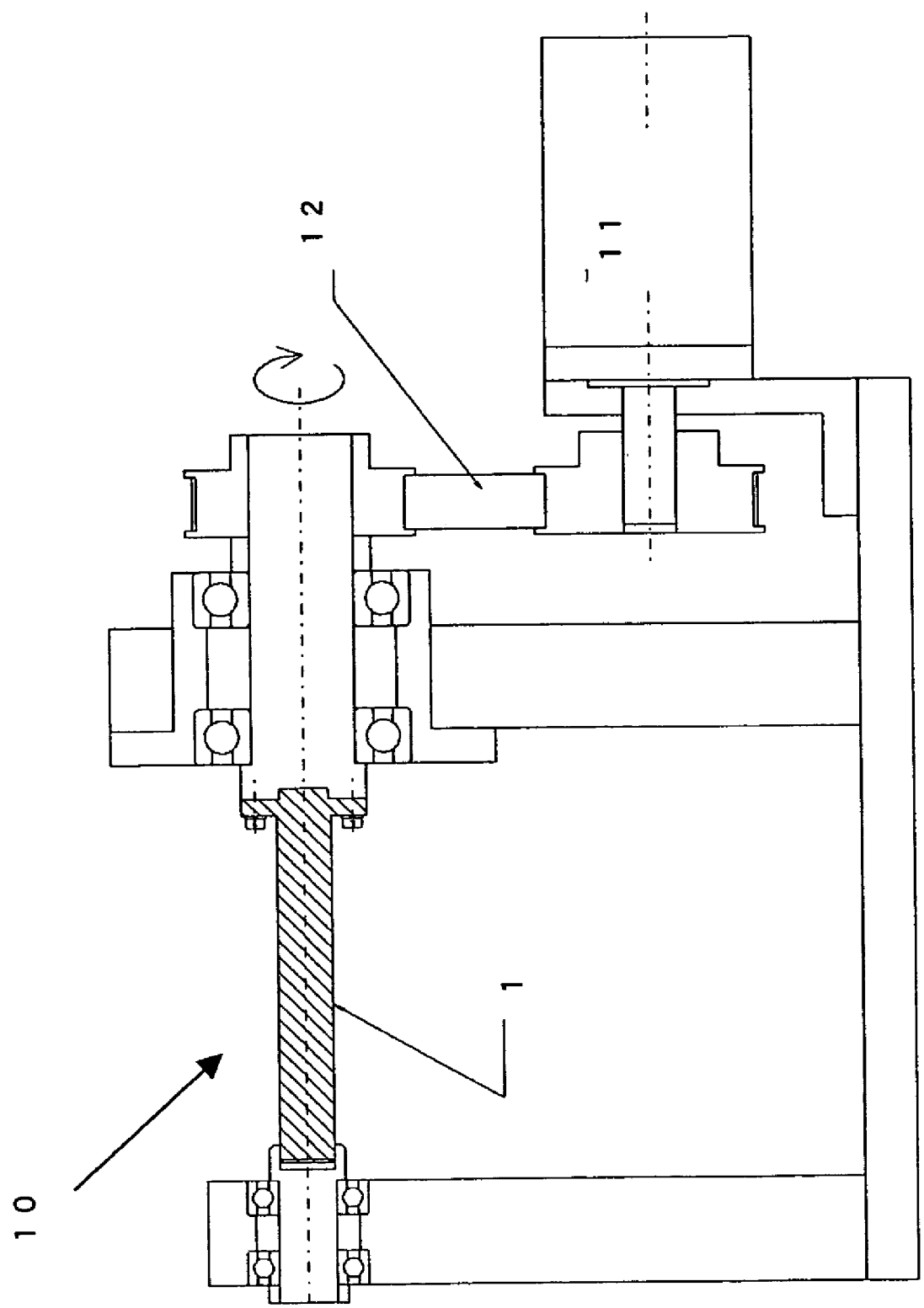
FIG. 4 is a cross-sectional view of an electrode assembly winding device having the winding core for use in preparation of a flat wound electrode assembly according to the present invention.

The embodiments of the present invention will now be described using examples with lithium ion secondary cells taken as examples. FIG. 1 is a schematic view showing the method of producing a flat wound electrode assembly for use in lithium ion cells, and FIG. 4 is a cross-sectional view of an electrode assembly winding device 10. The electrode assembly winding device 10 is of the same structure as known structures except for the distinct shape of the winding core 1. Upon activation of a motor 11 the winding core 1 is revolved via a belt 12 at a revolution rate of 300-500 rpm, thus winding the separator and positive and negative electrodes inserted into the winding core 1 that is the center of revolution.

EXAMPLE 1

<Preparation of Cell>

As shown in FIG. 1(a), the winding core 1, used for winding of the electrode assembly of a cell according to Example 1, is made of steel material, and has a circular cross section (16 mm in diameter) and a slit 2 that is 5 mm away from the center of the core. The slit 2 divides the winding core 1 into a first member 1a wherein its cross sectional-area in the direction orthogonal to the revolving axis and the peripheral length of the cross section are larger than those of a second member 1b and the second member 1b wherein its cross sectional-area and the peripheral length of the cross section are smaller than those of the first member 1a. The second member 1b has part thereof removed.

Into this slit 2 of the winding core 1, a separator 3 made of fine porous film (22 μm thick) of polyolefin-based resin was inserted, and then as shown in FIG. 1(b), the winding core was half-revolved so that the separator 3 was wound over the first member 1a and the second member 1b. Then, a negative electrode plate 4 in which a negative electrode mixture mainly made of graphite was applied on a copper foil prepared by a known method was placed in the removed portion 1c of the winding core 1 such that the negative electrode plate 4 was not in contact with winding core 1. Then, after winding the negative electrode 4 and separator 3 for one full revolution, a positive electrode plate 5 in which a positive electrode mixture mainly made of cobaltic acid lithium was applied on an aluminum foil prepared by a known method was placed between the inner and outer portions of the separator. Subsequently, by winding the separator 3 and the positive and negative electrodes 4 and 5 and removing the winding core 1, the wound electrode assembly as shown in FIG. 1(d) was obtained.

Then, the electrode assembly was pressed from a direction in which each end 4a and 5a of the positive and negative electrodes 4 and 5 on the side of the center of winding would not bend, and thus the flat wound electrode assembly as shown in FIG. 1(e) was obtained. A perspective view of the winding center of this flat wound electrode assembly seen from the shortest radius direction showed that two portions of the innermost electrode plate of one polarity (negative electrode) faced each other via a duplicate portion of the separator as shown in FIG. 1(e). The length of the separator used here was 700 mm. Note that the positional relationship of the positive and negative electrodes 4 and 5 after the winding is preferably such that as shown in FIG. 1(e), each end 4a and 5a of the positive and negative electrodes 4 and 5 on the side of the center of winding does not bend, and the length from each end 4a and 5a of the positive and negative electrodes 4 and 5 to the first bending portion 4b and 5b becomes the longest.

Subsequently, the flat wound electrode assembly was inserted into a square outer casing can and a sealing cover was crimped to the opening end of the outer casing can. Further, the outer casing can and the sealing cover were laser-welded. Then, an electrolyte was injected through the electrolyte injection hole of the sealing cover, and then a packing was inserted into the through hole of the electrolyte injection hole. Subsequently, while pressing the packing, an injection hole sealing plate was crimped to the upper edge of a protruding portion that was in linkage with the through hole, and the periphery of the injection hole sealing plate and the sealing cover was laser-welded. Thus, a cell was prepared. The size of the cell prepared was 4 mm thick, 28 mm wide, and 48 mm in height.

COMPARATIVE EXAMPLE 1

Figure 5:
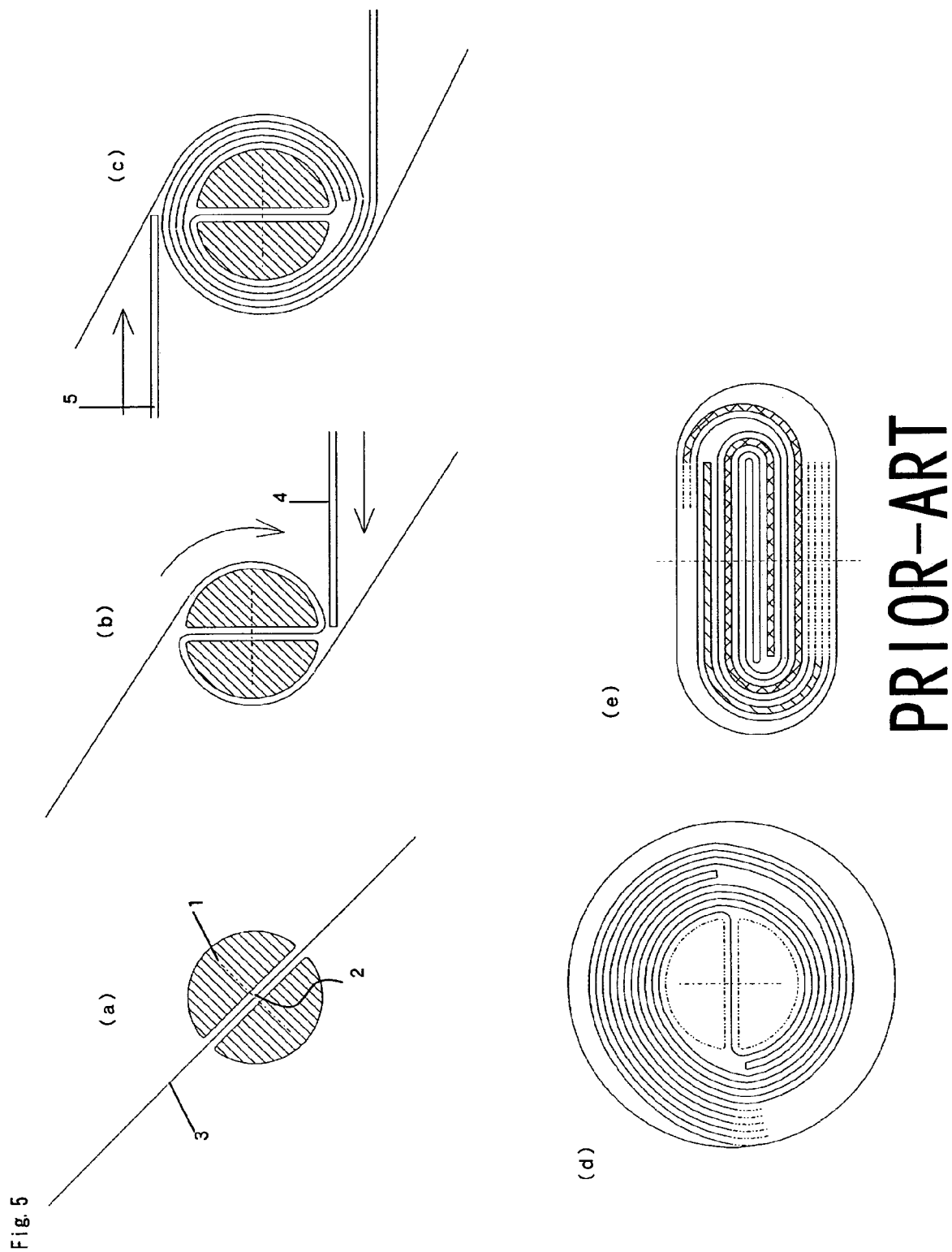
FIG. 5 is a schematic view showing the winding core for use in preparation of a flat wound electrode assembly according to the prior art technique and the method of preparing an electrode assembly.

A cell having a flat wound electrode assembly as shown in FIG. 5(a) was prepared in the same manner as in Example 1 above, except that the slit 2 was provided along the diameter of a circular winding core 1 and the resulting winding core 1 used was composed of two members of the same cross sectional-area and peripheral length of the cross section. A perspective view of the cylindrical center of this flat wound electrode assembly seen from the shortest radius direction showed that two portions of the innermost electrode plate of one polarity (negative electrode) faced each other via a quadruplicate portion of the separator, as shown in FIG. 5(e). The length of the separator used here was 735 mm.

While the length of the separator used in Example 1 above was 700 mm, that in Comparative Example 1 was longer than Example 1 by 35 mm.

This is because of the fact that in Example 1, a perspective view of the cylindrical center of this flat wound electrode assembly seen from the shortest radius direction showed that two portions of the innermost electrode plate of one polarity (negative electrode) faced each other via a duplicate portion of the separator, while in Comparative Example 1 the perspective view showed that two portions of the innermost electrode plate of one polarity (negative electrode) faced each other via a quadruplicate portion of the separator, as shown in FIGS. 1(e) and 5(e). As a result, although discharging characteristics are the same in Example 1 and Comparative Example 1, the difference of the amount of the separator used reduces the volume of the electrode assembly of Example 1, thus improving volume energy density and facilitating the insertion of the electrode assembly into the square outer casing can. Additionally, the reduction in the volume of the electrode assembly reduces the pressure in the step of pressure-molding the electrode assembly into the flat wound electrode assembly. This improves the impregnation characteristics of the electrolyte into the electrode assembly, improving cell characteristics.

EXAMPLE 2

Figure 2:
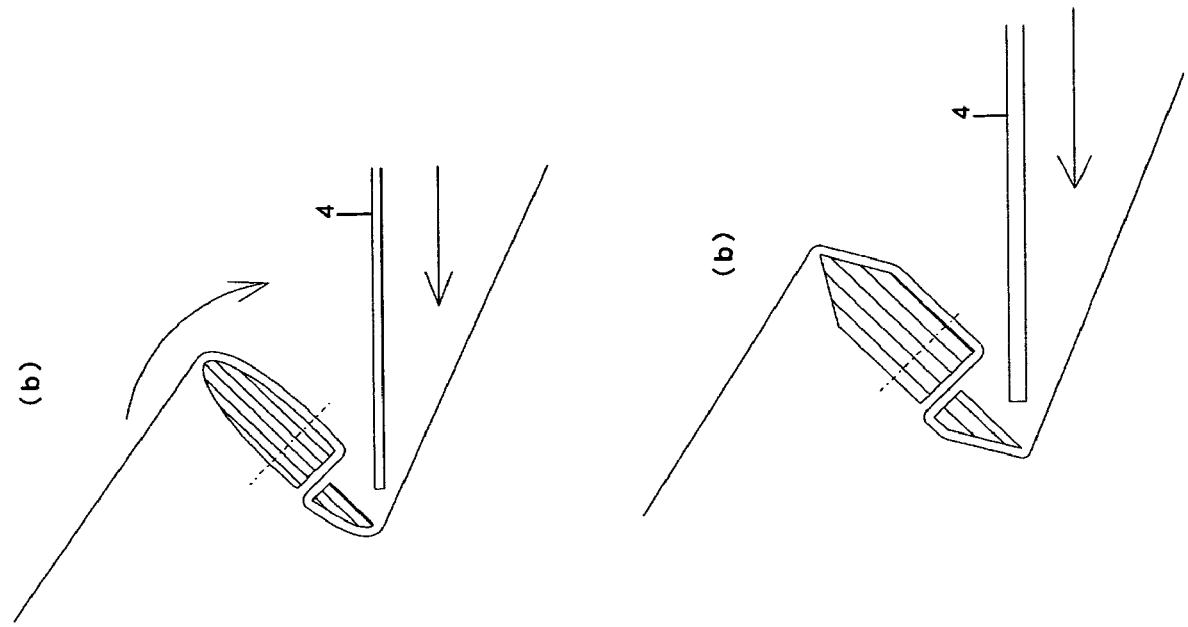
FIG. 2 is a schematic view showing the winding core for use in preparation of a flat wound electrode assembly according to Example 2 and the method of preparing an electrode assembly.

As shown in FIG. 2(a), the winding core 1, used for winding of the electrode assembly of a cell according to Example 2, has an oval cross section (16 mm for the longer diameter and 6 mm for the shorter diameter) and a slit 2 that is 5 mm away from the center of the longer diameter. The slit 2 divides the winding core 1 into a first member 1a wherein its cross sectional-area and the peripheral length of the cross section are larger than those of a second member and the second member 1b wherein its cross sectional-area and the peripheral length of the cross section are smaller than those of the first member. The second member 1b has part thereof removed.

A cell was prepared in the same manner as in Example 1 above except for using the above winding core. A perspective view of the winding center of the flat wound electrode assembly housed in this cell seen from the shortest radius direction showed that two portions of the innermost electrode plate of one polarity (negative electrode) faced each other via a duplicate portion of the separator.

This result shows that even with a winding core of an oval cross section, the same result as when using a winding core of a circular cross section is obtained.

(Miscellaneous)

The production method of the present invention provides satisfactory effects with any flat wound electrode assembly, and therefore can be applied to primary cells and secondary cells. While in the above examples lithium ion cells were prepared, the present invention can be used for alkali storage cells, lithium primary cells, and the like. Specific examples of the cell outer casing can for housing the flat wound electrode assembly include, other than the square outer casing cans used in the above examples, laminate outer casing structures, and the like.

Figure 3:
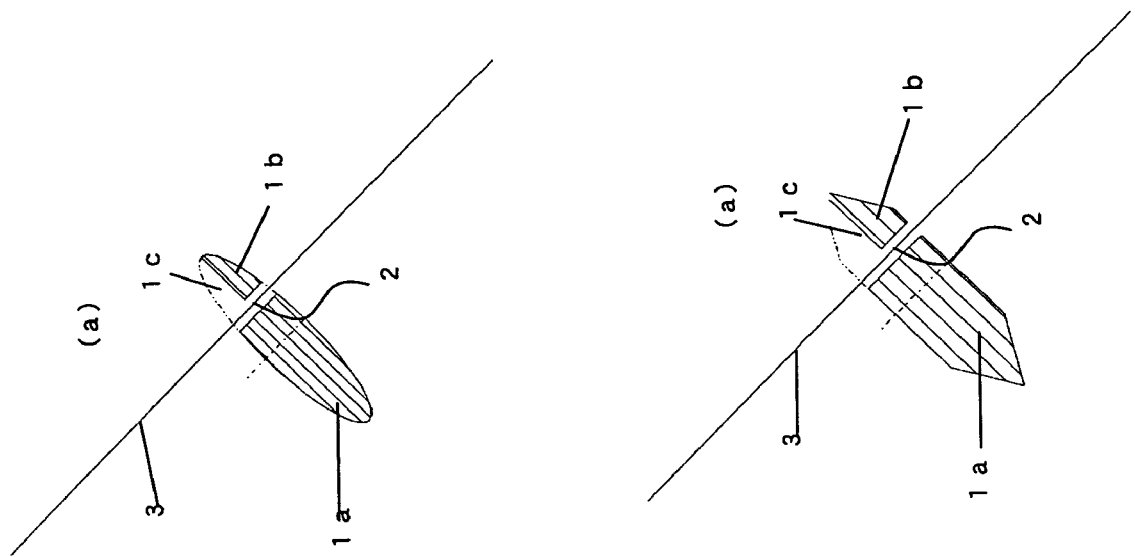
FIG. 3 is a schematic view showing a modified example of the winding core for use in preparation of a flat wound electrode assembly according to the present invention and the method of preparing an electrode assembly.

While in the above examples the winding core used had a circular cross section or oval cross section, the present invention will not be limited to these cross sections; a winding core having a polygonal cross section as shown in FIG. 3 and the like can be used. The position of the slit, the size of the removed part, and the like can be conveniently adjusted. Alternatively, the removed part need not be provided.

As has been described above, according to the present invention, by an easy means of changing the shape of the winding core for use in preparation of a flat wound electrode assembly, it is made possible to reduce the degree of lamination of the separator at the center of the electrode assembly, which results in a reduced volume thereof. Thus, the present invention provides such an advantageous effect that by an easy means the volume energy density of a cell using a flat wound electrode assembly is improved with reliability.

What is claimed is:

1. A cell comprising a cell outer casing structure, a flat wound electrode assembly housed in the cell outer casing structure, and an electrolyte, wherein:

the flat wound electrode assembly is such that a positive electrode plate and a negative electrode plate are spirally wound with a separator therebetween into a flat shape; and a perspective view of a center of the flat wound electrode assembly seen from a shortest radius shows that two portions of an innermost electrode plate of one polarity face each other via a duplicate portion of a separator.

2. The cell according to claim 1, wherein:

each end of the negative electrode plate and the positive electrode plate on a side of a center of the winding does not bend, the positive electrode plate and the negative electrode contained in the flat wound electrode assembly; and a length from each end of the positive electrode plate and the negative electrode plate on the side of the center of the winding to each first bending portion is the longest.

3. A method of producing a cell comprising a flat wound electrode assembly, the method comprising the steps of:

with the use of a winding core comprising a first member wherein its cross sectional-area in the direction orthogonal to a revolving axis and a peripheral length of the cross section are larger than those of a second member and the second member wherein its cross sectional-area in the direction orthogonal to the revolving axis and the peripheral length of the cross section are smaller than those of the first member, and after passing a strip-shaped separator between the first member and the second member, placing one strip-shaped electrode plate near the second member such that the plate is not in contact with the winding core, and winding for one revolution the one electrode plate and the strip-shaped separator toward the first member;

placing the other strip-shaped electrode plate between inner and outer portions of the separator that have been wound along with the one electrode, and winding the both electrode plates along with the separator toward the first member by revolving the winding core; and removing the winding core and pressure-molding the resulting wound article into the flat wound electrode assembly.

4. The method according to claim 3, wherein the cross sectional area orthogonal to the revolving axis of the winding core is a point-symmetrical shape.

5. The method according to claim 3, wherein the cross sectional area orthogonal to the revolving axis of the winding core is such a shape that part of the point-symmetrical view is removed, and the removed shape is formed by removing part of the second member, the removed part of the second member being on a rear side in the direction of revolution.

6. The method according to claim 3, wherein:

each end of the one electrode plate and the other electrode plate on a side of a center of the winding does not bend, the positive electrode plate and the negative electrode contained in the flat wound electrode assembly; and a length from each end of the one electrode plate and the other electrode plate on the side of the center of the winding to each first bending portion is the longest.

* * * * *